E. P. MILLER.
CHUCK FOR MACHINE TOOLS.
APPLICATION FILED DEC. 26, 1917.

1,400,306.

Patented Dec. 13, 1921.
2 SHEETS—SHEET 1.

Witness:
C. E. Burnap

Inventor:
Edwin P. Miller
By Sheridan, Sheridan & Smith, Attys

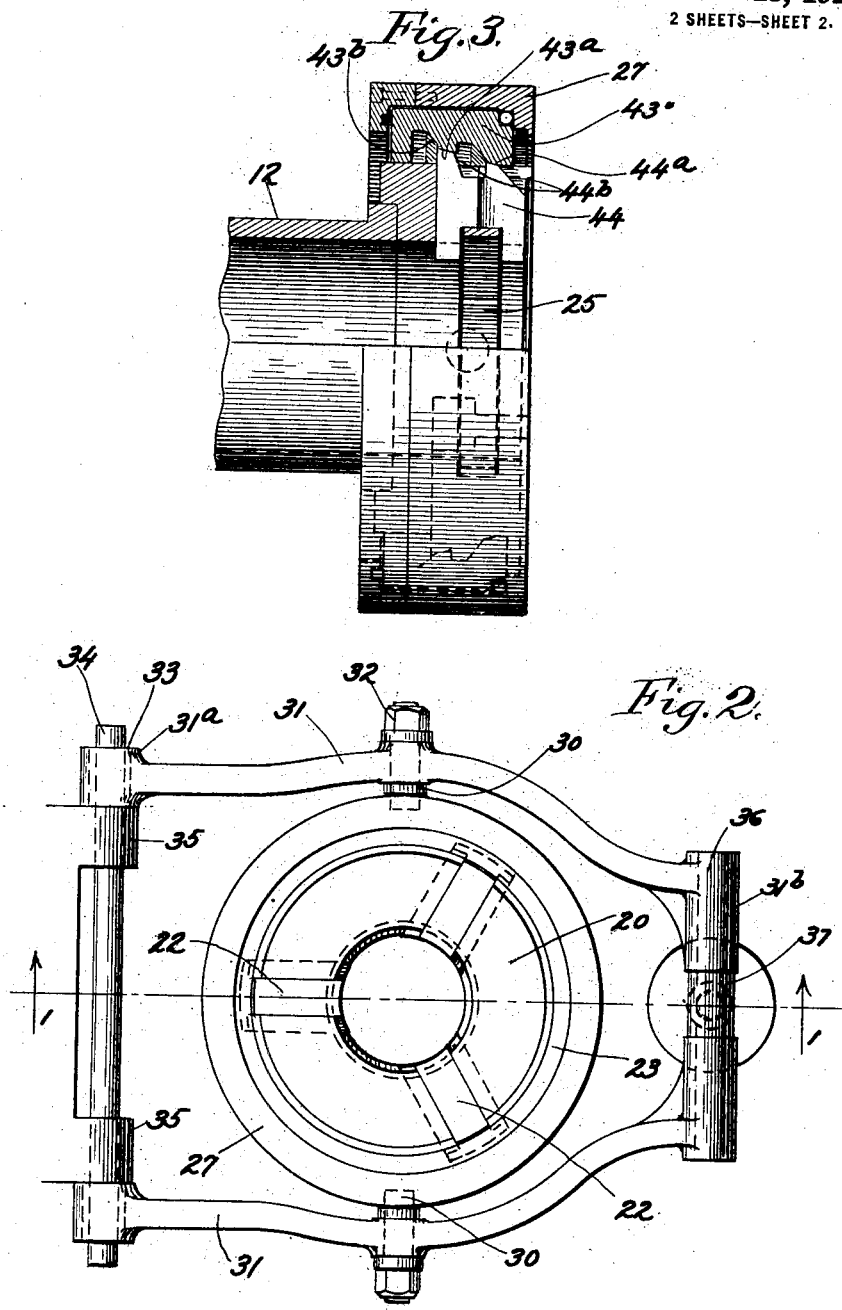

UNITED STATES PATENT OFFICE.

EDWIN P. MILLER, OF CHICAGO, ILLINOIS, ASSIGNOR TO HANNIFIN MANUFACTURING COMPANY, OF CHICAGO, ILLINOIS, A CORPORATION OF ILLINOIS.

CHUCK FOR MACHINE-TOOLS.

1,400,306.        Specification of Letters Patent.        Patented Dec. 13, 1921.

Application filed December 26, 1917. Serial No. 208,906.

*To all whom it may concern:*

Be it known that I, EDWIN P. MILLER, a citizen of the United States, residing at Chicago, in the county of Cook and State of Illinois, have invented certain new and useful Improvements in Chucks for Machine-Tools, of which the following is a specification.

This invention relates to chucks for machine tools, and its purpose is to provide an improved chuck for automatically centering the piece to be operated upon, and for holding the same with its longitudinal axis coincident with the corresponding axis of the chuck. Although the present invention has many advantages for various uses, the form herein described is of particular advantage when used for holding pieces of very great length which could not be handled successfully in any other form of chuck.

The principal object of the invention is to provide a chuck having two sets of gripping jaws spaced apart and actuated to grip the piece independently of each other, and thereby position different parts of the piece in proper alinement with respect to the axis of rotation of the chuck. A further object is to provide a chuck having separate sets of independent jaws which may be simultaneously actuated to grip and center different parts of a piece of relatively great length.

A further feature is the provision of improved gripping means and apparatus for operating the same. Other objects relate to various features of construction and arrangement which will appear more clearly hereinafter.

The nature of the invention will be understood from the following specification, taken in connection with the accompanying drawings in which certain embodiments of the invention are illustrated.

In the drawings—

Fig. 2 shows a top plan view of the same; and

Fig. 3 shows an enlarged transverse section through one end of the chuck, illustrating a modified construction of the jaw-actuating ring and gripping jaws.

Figure 1:
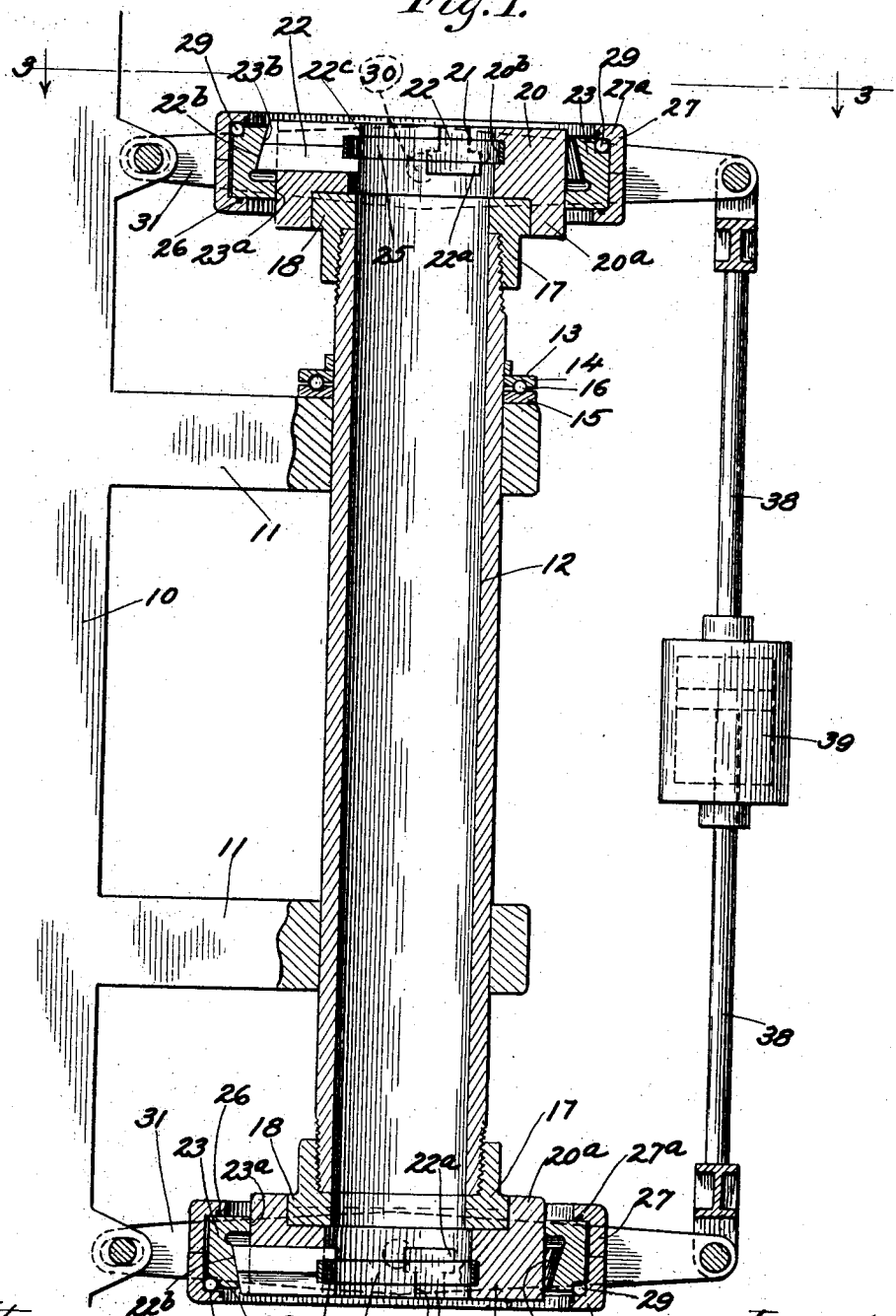
Figure 1 shows a longitudinal vertical section through my improved chuck taken on the line 1—1 of Fig. 2.

In the accompanying drawings, the numeral 10 designates a supporting structure comprising outwardly-extending arms 11 in which the cylindrical or sleeve-like body 12 of the chuck is mounted to rotate about a vertical axis. The weight of the chuck is supported on the frame by a thrust bearing 13 comprising annular rings or raceways 14 and 15, which are connected to the body 12 and one arm 11, respectively, and arranged to receive the balls 16 between them. The body 12 of the chuck carries at each end an annular outwardly-directed flange 18, which may be formed with the body of the chuck at one end, or preferably formed on caps 17 which have a threaded or other suitable engagement with the ends of the body 12. Each of the cap members 17 carries a jaw-carrying member 20 in the form of a cylindrical ring or band, having a flange $20^a$ to fit over the adjacent member 17 to which it is secured by any means suitable for that purpose. Each ring 20 is provided with a plurality of radially extending T-shaped slots 21 extending inwardly from the end thereof to receive the gripping jaws 22. These jaws have arms $22^a$ to fit the corresponding notches of the T-shaped slots, so that the jaws are prevented from moving longitudinally of the axis of the chuck but are permitted to move freely in a radial direction with respect to the axis of the chuck. The outer cylindrical surface of each jaw-carrying member 20 has slidably mounted thereon a jaw-actuating ring 23, having a cylindrical bore $23^a$ to coact with the cylindrical surface of the member 20, and having another bore formed with an annular inclined surface $23^b$ adapted to coact with inclined surfaces $22^b$ formed on the jaws 22. The jaws are provided on their inner sides with grooves $22^c$ adapted to receive band springs 25 which rest in annular grooves $20^b$ in the members 20 and normally press the jaws outwardly against the inclined surfaces of the rings 23. Upon relative movement of one of the members 23 with respect to the adjacent member 20, the coacting inclined surfaces on the jaws and the jaw-actuating member operate to move the jaws inwardly in a radial direction to grip the piece of iron, steel, or the like, which is inserted within the body 12.

In the construction herein illustrated, the jaws at the upper and lower ends of the body of the chuck have their outer surfaces inclined in opposite directions, so that when the members 23 move toward each other a gripping movement of the jaws is effected. This gripping movement of the jaws is accomplished by actuating mechanism comprising annular bands or collars 27, which are mounted upon the members 23 and provided with flanges 27$^a$ to inclose the opposite sides of the jaw-actuating members. On the upper side of the upper member 23 and on the lower side of the lower member 23 annular grooves 28 are provided to receive the balls 29 which form thrust bearings for transmitting pressure from the rings 27 to the rings 23, it being understood that the members 23 are adapted to rotate freely within the members 27. The inner surfaces of the walls 27$^a$ are also provided with annular grooves in which suitable packing material 26 is mounted. The actuating rings 27 have secured thereto at opposite sides the pins 30, which pivotally engage suitable apertures in the lever arms 31 and are secured at their outer ends by nuts 32. Two of the arms 31 are provided at each end of the chuck, and these arms are provided at one end with hubs 31$^a$ having elongated apertures 33 therein to receive the pin or shaft 34, which is fixed in suitable supports 35 carried by the supporting structure 10. The opposite ends of the lever arms 31 are curved inwardly around the body of the chuck, as shown in Fig. 2, and are provided with hubs or sleeves 31$^b$ adapted to receive the pins 36, having pivotally mounted thereon the bracket members 37. These bracket members are connected to actuating rods 38 which in turn are actuated by suitable means, such as a compressed air cylinder 39, whereby the rods 38 may be moved toward or away from each other in order to cause corresponding relative movements of the jaw-actuating members 23 with respect to the jaw-carrying members 20. It will be apparent that when the rods 38 are moved toward each other, thereby causing a corresponding movement of the members 23, the relative movement of the inclined annular surfaces of the members 23 on the jaws will move the latter inwardly and cause them to engage the piece substantially simultaneously. When it is desired to release the jaws from the piece the rods 38 are actuated in the opposite direction, thus causing the members 23 to move away from each other toward the ends of the chuck, whereupon the band springs 25 cause the jaws to move outwardly in a radial direction. The elongated slots 33 in the arms 31 permit the necessary pivotal movement of the lever arms without causing a twisting or bending strain upon the body of the chuck.

It will be obvious that the jaws of each set may be formed of any desired size, and that the inclination of the actuating surface may be varied in any desired manner, so that one set of jaws, acting independently of the other, may grip a cross section of any size regardless of the thickness of the part gripped by the other set of jaws. Moreover, it is also clear that the actuating mechanism may continue to operate one set of jaws after the other set has gripped the piece, so that, regardless of the irregularities in the cross section of the piece, it is held firmly at both ends, and these widely separated parts are automatically centered with respect to the axis of rotation of the chuck. In this form of construction the body of the chuck may be made of any desired length without affecting the accuracy of the device for automatically positioning the piece at opposite ends of the chuck.

In the enlarged sectional view, illustrated in Fig. 3 of the drawings, I have shown a modified form of actuating member, designated by the numeral 43, adapted to coact with modified gripping jaws 44. The other parts of the construction are substantially the same as previously described. In this modification the inclined gripping surface of the actuating member 43 has two component parts which have different inclinations to correspond with different inclinations on corresponding parts of the inclined surfaces of the jaws, so that during the initial movement of the jaw-actuating member the jaws have a relatively rapid inward movement and a comparatively small gripping force, while the engagement of the other component parts of the inclined surfaces adjacent the end of the gripping movement produces a relatively slow movement of the jaws but exerts a pressure thereon which has a relatively large component in a radial direction. This desirable result is accomplished by forming the member 43 with one or more annular inclined surfaces 43$^a$ which have a comparatively small inclination with respect to the axis of rotation of the chuck, in combination with one or more other annular inclined surfaces 43$^b$ which have a relatively great inclination with respect to the axis of the chuck. The inclined surfaces 43$^a$ are adapted to coact with similar inclined surfaces 44$^a$ formed on the jaws, and the inclined surfaces 43$^b$ are adapted to coact with the inclined surfaces 44$^b$ formed on the jaws. In the construction illustrated, two of the surfaces, 43$^a$ and 43$^b$, are provided on each member 43, and two of the corresponding surfaces, 44$^a$ and 44$^b$, are provided on the jaws, these surfaces being formed by providing annular grooves in the inner face of the member 43 and in the jaws so that these members in the cross sectional view have an apparent toothed construction, as illustrated.

As shown in the drawings the jaw is in gripping position, but when the member 43 is moved to the right the surfaces 43$^a$ pass out of engagement with the surfaces 44$^a$, and the jaws then slide outwardly in a radial direction at a relatively rapid rate with the surfaces 44$^b$ thereof coacting with the surfaces 43$^b$, this action being produced by the band spring 25 previously described. This construction has the advantage that it produces a quick action of the jaws during the time when they are merely passing to gripping position, while a relatively slow movement thereof is effected when they actually engage the piece, and the radial component of the pressure is correspondingly increased so that the piece to be operated upon is firmly held by the jaws when they reach their final gripping positions.

Although I have shown and described certain forms of my invention for purposes of illustration, it will be understood that it may be embodied in widely different forms without departing from the scope of the invention as defined in the appended claims.

What I claim is:

1. The combination in a device of the class described, of a long tubular body member, bearing members engaging said body member between its ends for supporting the same, a plurality of radially movable jaws mounted at each end of said body member, jaw actuating members mounted outwardly of said jaws, and means for effecting relative movement of said jaw actuating members with respect to said body member for actuating said jaws.

2. The combination in apparatus of the class described, of a relatively long rotatably mounted body member, jaw holding members carried at opposite ends of said body member, radially movable jaws slidably mounted in said jaw holders, jaw actuating members slidably mounted on said jaw holding members, said jaw actuating members and said jaws having coacting inclined surfaces whereby relative movement of said jaw actuating members and said jaw holders produces radial movements of said jaws, and pivoted levers operatively connected with said jaw actuating members for moving the same longitudinally of said body member.

3. The combination in apparatus of the class described, of a relatively long rotatably mounted body member, jaw holding members carried at opposite ends of said body member, radially movable jaws slidably mounted in said jaw holders, jaw actuating members slidably mounted on said jaw holding members, said jaw actuating members and said jaws having coacting inclined surfaces whereby relative movement of said jaw actuating members and said jaw holders produces radial movements of said jaws, pivoted levers operatively connected to said jaw actuating members, and means connected to said levers for actuating the same.

4. The combination in apparatus of the class described, of a relatively long rotatably mounted body member, jaw holding members carried at opposite ends of said body member, radially movable jaws slidably mounted in said jaw holders, jaw actuating members slidably mounted on said jaw holding members, said jaw actuating members and said jaws having coacting inclined surfaces whereby relative movement of said jaw actuating members and said jaw holders produces radial movements of said jaws, collars in which said jaw actuating members are rotatably mounted, and means connected to said collars for moving the same longitudinally of said body member.

5. The combination in apparatus of the class described, of a relatively long rotatably mounted body member, jaw holding members carried at opposite ends of said body member, radially movable jaws slidably mounted in said jaw holders, jaw actuating members slidably mounted on said jaw holding members, said jaw actuating members and said jaws having coacting inclined surfaces whereby relative movement of said jaw actuating members and said jaw holders produces radial movements of said jaws, collars in which said jaw actuating members are rotatably mounted, pivoted levers connected to said collars, and means connected to said levers for simultaneously actuating the same.

6. The combination in a device of the class described, of a long hollow body member, jaw holders mounted at opposite ends of said body member, radially movable jaws slidably mounted in said jaw holders, said jaws having inclined surfaces on their outer ends, jaw actuating member surrounding said jaw holders and having inclined surfaces to engage the inclined surfaces of said jaws, grooved collars surrounding and loosely engaging said jaw actuating members, and means extending between and connecting said collars for simultaneously actuating them and thereby actuating said jaws at opposite ends of said body member.

7. The combination in a device of the class described, a long tubular body member extending vertically, a bearing member in which said body member is rotatably mounted, jaw holders mounted at the upper and lower ends of said body member, radially movable jaws mounted in said jaw holders, jaw actuating members movable toward each other to actuate said jaws, and means extending between the opposite ends of said body member on the outer side thereof for effecting simultaneous movement of said jaw actuating members.

In testimony whereof, I have subscribed my name.

EDWIN P. MILLER.

Witnesses:
LOUIS REISFELD,
JOHN A. SWATIK.